(12) United States Patent
Marjanen et al.

(10) Patent No.: US 8,912,917 B2
(45) Date of Patent: Dec. 16, 2014

(54) MONITORING MODULE, SYSTEM AND METHOD

(75) Inventors: Ykä Marjanen, Oulu (FI); Janne Göös, Kempele (FI)

(73) Assignee: Vibsolas Oy, Oulu (FI)

( * ) Notice: Subject to any disclaimer, the term of this patent is extended or adjusted under 35 U.S.C. 154(b) by 201 days.

(21) Appl. No.: 13/697,217

(22) PCT Filed: May 17, 2011

(86) PCT No.: PCT/FI2011/050446
§ 371 (c)(1),
(2), (4) Date: Dec. 7, 2012

(87) PCT Pub. No.: WO2011/144811
PCT Pub. Date: Nov. 24, 2011

(65) Prior Publication Data
US 2013/0082848 A1    Apr. 4, 2013

(30) Foreign Application Priority Data

May 18, 2010   (FI) ..................................... 20105541

(51) Int. Cl.
| | | |
|---|---|---|
| G08B 23/00 | (2006.01) | |
| G08B 26/00 | (2006.01) | |
| G08B 25/00 | (2006.01) | |
| H04W 4/02 | (2009.01) | |
| H04W 84/18 | (2009.01) | |

(52) U.S. Cl.
CPC ............... *G08B 26/00* (2013.01); *H04W 4/023* (2013.01); *G08B 25/009* (2013.01); *H04W 84/18* (2013.01)
USPC ...... 340/870.02; 340/5.1; 340/10.5; 340/506; 340/601; 455/456.1; 455/423

(58) Field of Classification Search
CPC .............................. G08B 25/009; G08B 26/00
USPC .................... 340/870.02, 5.1, 10.5, 506, 601; 455/423, 456.1
See application file for complete search history.

(56) References Cited

U.S. PATENT DOCUMENTS

| | | | |
|---|---|---|---|
| 4,536,747 A * | 8/1985 | Jensen | 340/502 |
| 6,737,962 B2 * | 5/2004 | Mayor | 340/431 |

(Continued)

FOREIGN PATENT DOCUMENTS

| | | |
|---|---|---|
| CN | 1564216 A | 1/2005 |
| CN | 2773814 Y | 4/2006 |

(Continued)

OTHER PUBLICATIONS

International Search Report issued in International Patent Application No. PCT/FI2011/050446 mailed Jun. 22, 2011.

(Continued)

*Primary Examiner* — Tai T Nguyen
(74) *Attorney, Agent, or Firm* — Oliff PLC

(57) ABSTRACT

A method for operating a monitoring module in a monitoring system. A monitoring module is configured with means for detecting impulse signals from sensors of the monitoring module and from other monitoring modules of the monitoring system, and with one or more groups of functions. A function defines a relation between an impulse signal detected by a monitoring module and a monitoring response of the monitoring module, and each group of functions corresponds with one level of hierarchy of monitoring modules of the monitoring system. One or more impulse signals from a sensor of the monitoring module and/or from another monitoring module of the monitoring system are detected; and a prevailing set of functions in a group of functions is determined. One or more monitoring responses are then determined with the prevailing set of functions.

15 Claims, 5 Drawing Sheets

(56) References Cited

U.S. PATENT DOCUMENTS

| | | |
|---|---|---|
| 6,754,704 B1 | 6/2004 | Prorock |
| 6,832,251 B1 | 12/2004 | Gelvin et al. |
| 7,020,701 B1 | 3/2006 | Gelvin et al. |
| 7,633,378 B2 * | 12/2009 | Rodgers et al. ............... 340/10.5 |
| 2003/0212511 A1 | 11/2003 | Carle et al. |
| 2004/0012491 A1 | 1/2004 | Kulesz et al. |
| 2006/0095539 A1 | 5/2006 | Renkis |
| 2006/0229086 A1 | 10/2006 | Broad et al. |
| 2008/0238651 A1 | 10/2008 | Kucharyson |
| 2009/0195396 A1 | 8/2009 | Ballester Merelo et al. |

FOREIGN PATENT DOCUMENTS

| | | |
|---|---|---|
| CN | 101246630 A | 8/2008 |
| CN | 101436336 A | 5/2009 |
| JP | A-2006-268161 | 10/2006 |

OTHER PUBLICATIONS

Written Opinion of the International Searching Authority issued in International Patent Application No. PCT/FI2011/050446 mailed Jun. 22, 2011.

Search Report issued in Finnish Patent Application No. 20105541 dated Nov. 19, 2010 (with translation).

Translation of Search Report issued in Chinese Patent Application No. 2011800248158 dated Feb. 12, 2014.

* cited by examiner

| L01 | L02 | L03 | L04 | L05 | L06 | L07 | L0

| L11 | L12 | L13 | L14 | L15 | L16 | L1

| L21 | L22 | L23 | L24 | L25 | L2

| L31 | L32 | L33 | L3

Figure 3

| L11 | L14 | L15 | $D1_{L1}$

| L11 | L12 | L13 | L14 | L15 | L16 | $D2_{L1}$

| L21 | L22 | L23 | L24 | $D3_{L2}$

Figure 4

MONITORING MODULE, SYSTEM AND METHOD

FIELD OF THE INVENTION

The present invention relates to monitoring systems, and especially to a monitoring module, a monitoring system, a monitoring method and a computer program product according to the preambles of the independent claims.

BACKGROUND ART

Monitoring refers generally to an act of watching and checking a situation for a period of time in order to discover some element about it. A situation, as such, refers to a set of things that are happening and/or the conditions that exist at a particular time and place. In the following, a set of things that are happening and/or the conditions that exist are jointly called as impulses. A monitoring module is an apparatus that can be positioned temporarily or permanently to a particular place to detect a set of impulses, and to generate impulse signals representing them. These impulse signals may be transferred to one or more data repositories for later use, or they may be used to trigger alarms, for example in a designated response centre. The task of such centre is to analyse the alarms and initiate appropriate measures needed to appropriately intervene a situation or influence a developed condition.

Monitoring has various commercial and industrial applications. A significant number of security systems are concerned with monitoring the environment. In addition to various burglar alarm systems there are meters for measuring consumption of utilities such as gas and electricity. There are also monitoring systems to watch over dangerous substances, such as fissile materials or hazardous chemicals. Vehicle systems, such as telemetry, taximeters and tachographs are widely used in road and marine transportation. These are only some examples, due to the rapid development of cost-effective wireless technologies; the application of monitoring systems has increased significantly. Also the size of the populations and/or the amount of impulses to be monitored has grown correspondingly.

One of the problems associated with the present monitoring systems is their poor capability to scale from small footprint systems to larger systems that have broader geographical extent and/or larger population. There are some clustered and hierarchic network topologies, which have been developed to dynamically route around obstacles and provide backup routes in case of a network congestion or device failure. However, even in those systems the amount of alarms and complexity of dealing with numerous different types of alarms in the response centre has imposed rigid limitations to the size of the system. In a conventional system that relies on a centralized decision making, the response centre relatively quickly becomes the bottleneck of the system, and any increase in complexity and/or device populations poses a risk to cause overload or delays in reacting to the impulses.

The effects of the increased number of monitoring module population could be compensated by limiting complexity with use of simplified alarm types, but that would obviously diminish the overall performance of the monitoring system. In a simplified system only a few selected happenings and conditions could actually be followed. However, the desire of most user organizations is to have a monitoring tool with which various different impulses could be effectively considered and acted upon.

SUMMARY

An object of the present invention is thus to provide a method and an apparatus for implementing the method so as to overcome at least one of the above problems. The object of the invention is achieved by a monitoring module, a monitoring system, a method and a computer program product, which are characterized by what is stated in the independent claims. Some preferred embodiments of the invention are disclosed in the dependent claims.

In the embodiments of the invention monitoring modules are elements that receive impulse signals from sensors of the monitoring module or from other monitoring modules. A monitored domain is formed by a group of monitoring modules, and divides into hierarchic levels, each of which corresponds with a specific set of functions. A function defines a relation between an impulse signal detected by a monitoring module and a monitoring response of the monitoring module. Advantageously the monitoring module function dealing with a detected impulse signal applies the detected signal and at least one other signal detected by the monitoring module.

In a general aspect, implementations may include a method for operating a monitoring module in a monitoring system. The method may comprise configuring the monitoring module with means for detecting impulse signals from sensors of the monitoring module and from other monitoring modules of the monitoring system; configuring the monitoring module with one or more groups of functions, a function defining a relation between an impulse signal detected by a monitoring module and a monitoring response of the monitoring module, each group of functions corresponding with one level of hierarchy of monitoring modules of the monitoring system; detecting one or more impulse signals from a sensor of the monitoring module and/or from another monitoring module of the monitoring system; determining a prevailing set of functions in a group of functions; and determining one or more monitoring responses with the prevailing set of functions.

In further aspects, the determination of the one or more monitoring responses may comprise using the detected impulse signal and at least one other impulse signal to generate one or more impulse signals; and sending the generated one or more impulse signals to a higher level monitoring module.

In further aspects, the determination of the one or more monitoring responses may comprise using the detected impulse signal and at least one other impulse signal to determine a transmission control operation; and using the determined transmission control operation to control sending of one or more impulse signals to a higher level monitoring module.

In further aspects, the determination of the one or more monitoring responses may comprise using the detected impulse signal and at least one other impulse signal to generate one or more trigger signals; and sending the one or more trigger signals to one or more alarm devices.

In further aspects, the determination of the one or more monitoring responses may comprise using the detected impulse signal and at least one other impulse signal to determine a transmission control operation; and using the determined transmission control operation to control sending of one or more trigger signals to an alarm device.

In further aspects, the determined transmission control operation may define routing or rate of transmissions of the resulting signals.

In further aspects, the method may comprise configuring the impulse signals from sensors of the monitoring module to represent one or more conditions detected by the sensors, the conditions depending on one or more of the following: position of a sensor, present time, ambient temperature, ambient humidity, ambient noise level, signals generated by the monitoring module during its normal operations.

In further aspects, the means for detecting impulse signals from other monitoring modules of the monitoring system may comprise one or more radio interfaces.

In further aspects, the method may comprise connecting the monitoring module at least for a period of transmitting an impulse signal with an element of a response system or with another monitoring module in the next higher level of hierarchy of monitoring modules of the monitoring system.

In further aspects, the method may comprise maintaining continuously a connection with the other monitoring module in the next higher level of hierarchy.

In further aspects, the method may comprise creating a connection with the other monitoring module in the next higher level of hierarchy only at the time an impulse signal needs to be transmitted.

In further aspects, the method may comprise configuring the monitoring module with a set of rules comprising state transition conditions for dynamically determining the prevailing set of functions.

In further aspects, the method may comprise maintaining at least one prevailing set of functions in the monitoring module; using the set of rules to detect a state transition condition; and changing the prevailing set of functions in response to a detected state transition condition.

In further aspects, the method may comprise operating without a prevailing set of functions in the monitoring module; using the set of rules to detect a state transition condition; and selecting the prevailing set of functions for a defined period in response to a detected state transition condition.

In further aspects, the defined period may correspond with the time from detecting the first impulse signal to implementing the monitoring response.

In further aspects, the set of rules may comprise an independent state transition condition that triggers a state transition in response to one or more impulse signals and the one or more impulse signals may be generated by the monitoring module itself.

In further aspects, the set of rules may comprise a relational rule that triggers a state transition in response to one or more impulse signals received from one or more monitoring modules.

In further aspects, the set of rules may comprise a relational rule that triggers a state transition in response to lack of impulse signals from another monitoring module.

In further aspects, the method may comprise including a function in a group of functions in a lowest level of hierarchy where impulse signals applied by the function are available at the same time.

In further aspects, a function may include elimination of an impulse signal received from a monitoring module in a lower level of hierarchy.

In further aspects, determination of the one or more monitoring responses with a function may comprise defining a type of an impulse signal, type of a trigger signal, destination of an impulse signal, destination of a trigger signal, routing of an impulse signal, routing of a trigger signal, rate for transmissions of an impulse signal, and/or rate for transmissions of a trigger signal.

In further aspects, the method may comprise configuring the monitoring module to determine its position in relationship with at least one other monitoring module of the monitoring system.

In a further aspect, implementations may include a monitoring module configured to operate according to any of the above methods.

In a further aspect, implementations may include a monitoring system comprising one or more of the above monitoring modules.

In further aspects, the one or more monitoring modules may form a monitored domain, the functions of the monitoring modules of the monitored domain operating according to a set of rules common for the particular monitored domain.

In further aspects, the monitoring system may comprise a response system.

In further aspects, the response system may comprise a response centre and/or an alarm device.

In further aspects, the response centre may be accessible to a monitoring module, the prevailing set of functions of which corresponds with the highest level of hierarchy of monitoring modules of the monitoring system.

In further aspects, the alarm device may be accessible to monitoring modules in any level of hierarchy of monitoring modules of the monitoring system.

In further aspects, at least two radio communication technologies may be applied in connections between the monitoring modules.

In further aspects, a first monitoring module of the monitoring system may be configured to determine its relational position that indicates the position in relationship with a second monitoring module in the next higher level of hierarchy; the second monitoring module may be configured with information on its absolute position; and in generating a monitoring response to an impulse signal including a relational position of the first monitoring module, the second monitoring module may translate the relational position of the first monitoring module to absolute position of the first monitoring module.

In a further aspect, implementations may include a computer program comprising program code means adapted to perform any of the above methods when the program is run on a monitoring module.

Use of hierarchy-level specific functions to deal with impulse signals allows elimination of unnecessary impulse signals in very early stages. Delegation of causality checks to the monitoring modules also facilitates use of more variable conditions and thus improves the accuracy and efficiency of the monitoring operations. These and other advantages provided by the embodiments of the invention are discussed further in the detailed description of embodiments.

BRIEF DESCRIPTION OF THE DRAWINGS

In the following, embodiments will be described in greater detail with reference to accompanying drawings, in which

FIG. 3 illustrates exemplary groups of functions for the hierarchic levels of the monitored domain;

FIG. 4 illustrates some exemplary roles and tasks of monitoring modules of the monitored domain;

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may also be combined to provide further embodiments.

The present invention is applicable to a monitoring system that comprises a plurality of separate monitoring modules. The modules of the monitoring system may apply one or more fixed or wireless communication technologies. The protocols used, the specifications of communication technologies, and device configurations evolve rapidly, especially in wireless communication. Therefore, all words and expressions in description of the embodiments are intended to illustrate, not to restrict the embodiment. In the following, some embodiments of the invention will be illustrated in more detail using an exemplary monitoring system in which the embodiments may be applied. The invention is not, however, restricted to this one specific system configuration.

Figure 1:
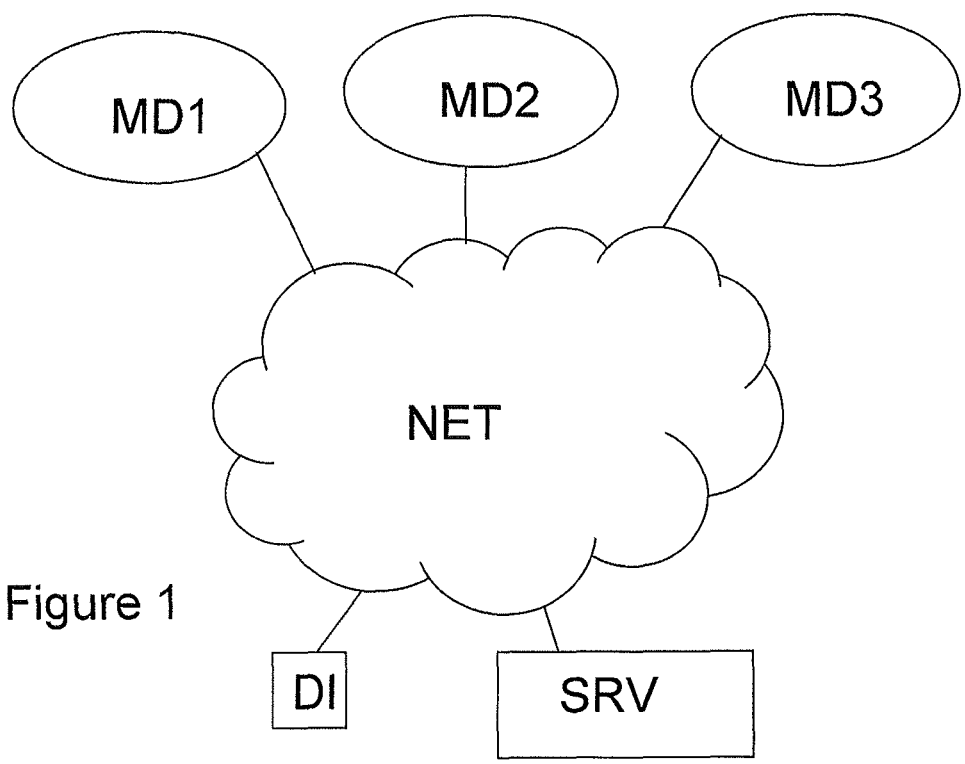
FIG. 1 illustrates a general architecture for a monitoring system.

A general architecture of a monitoring system is illustrated in FIG. 1. It is noted that FIG. 1 is a simplified chart showing some elements and functional entities that are necessary for describing the embodiments of the invention. Furthermore, the connections shown in FIG. 1 illustrate logical connections; the actual physical connections may be implemented in various ways, well known to a person skilled in the art.

In general, a monitoring system comprises a monitored domain and a response system for reacting to impulses generated in the monitored domain. The monitoring system may monitor one or more monitored domains MD1, MD2, MD3. In conventional systems a monitored domain is typically a geographic area to which monitoring modules are fixed or in which wireless monitoring modules may move around. In response to a predefined stimulus monitoring modules transmit an alarm signal to a centrally managed alarm centre.

In the improved monitoring system of FIG. 1, a monitored domain is a logical entity comprising a group of monitoring modules that can connect with other modules of the group. Monitoring modules of a monitored domain operate according to a set of rules common for the particular monitored domain. Depending on the applied connection type(s) between the monitoring modules, the geographic area of a monitored domain may vary significantly. The connection between monitoring modules may be implemented, for example by means of a personal area network (PAN), a local area network (LAN), a campus area network (CAN), a metropolitan area network (MAN), a wide area network (WAN), or any combination of these. A monitored domain may cover, for example, a single building or extend to cross metropolitan, regional, or even national boundaries. Geographic areas of separate monitored domains MD1, MD2, MD3 may overlap, but communication streams of separate monitored domains flow separately.

A monitoring module is a logical entity that comprises a combination of at least one physical device and functionality for operating in at least one monitored domain of the monitoring system. Typically one physical device operates as one monitoring module. One physical module device may also be simultaneously operable in two or more monitored domains, but then it must provide functionality of a monitoring module of each of the monitored domains it belongs to.

In addition to monitoring devices, the monitoring system may comprise one or more alarm devices (not shown). An alarm device is a logical entity that comprises a combination of at least one physical device and functionality for producing a sensory expression as a signal or warning, in response to a trigger signal from a monitoring module. The alarm device may be, for example, an acoustic device, like a siren, with a loud, often wailing sound, or a visual device with a bright, flashing light.

A monitored domain may be independent, so in its simplest form the monitoring system may be formed by one monitored domain only. In order to detach at least part of response operations from monitoring operations, the monitored domain may also be connected to a response centre via a network NET. The network NET may apply any of the network types mentioned for connection between the monitoring modules. NET may thus correspond to a network of networks that consists of a plurality of private, public, academic, business, and government networks of local to global scope that are linked by a broad array of electronic and optical networking technologies. An example of such network of networks is the Internet.

The response centre refers here to a logical entity that comprises a combination of at least one physical device and functionality for initiating an alarm activity, in response to a trigger signal from a monitoring module. The alarm activity may be triggered automatically or manually by an operator of the response centre. The alarm activity comprises one or more operations designed to manage the cause for the trigger signal. The alarm activity may comprise, for example, sending troops to the location of the monitoring module that initiated the trigger signal. Other alarm activities are well known to a person skilled in the art. In FIG. 1 a dispatch unit DI represents a designated response centre that maps impulse signals from the monitored domain MD1 to predefined alarm operations and activates these alarm operations.

A response system is a logical entity that comprises the alarm devices and/or response centres accessible to the monitoring modules of the monitoring system. The monitoring system may also comprise a shared alarm server SRV that acts as a primary destination address for impulse signals from a number of monitored domains, and forwards the alarms to respective alarm centres DI to be handled according to the common set of rules of each specific monitored domain.

Figure 2:
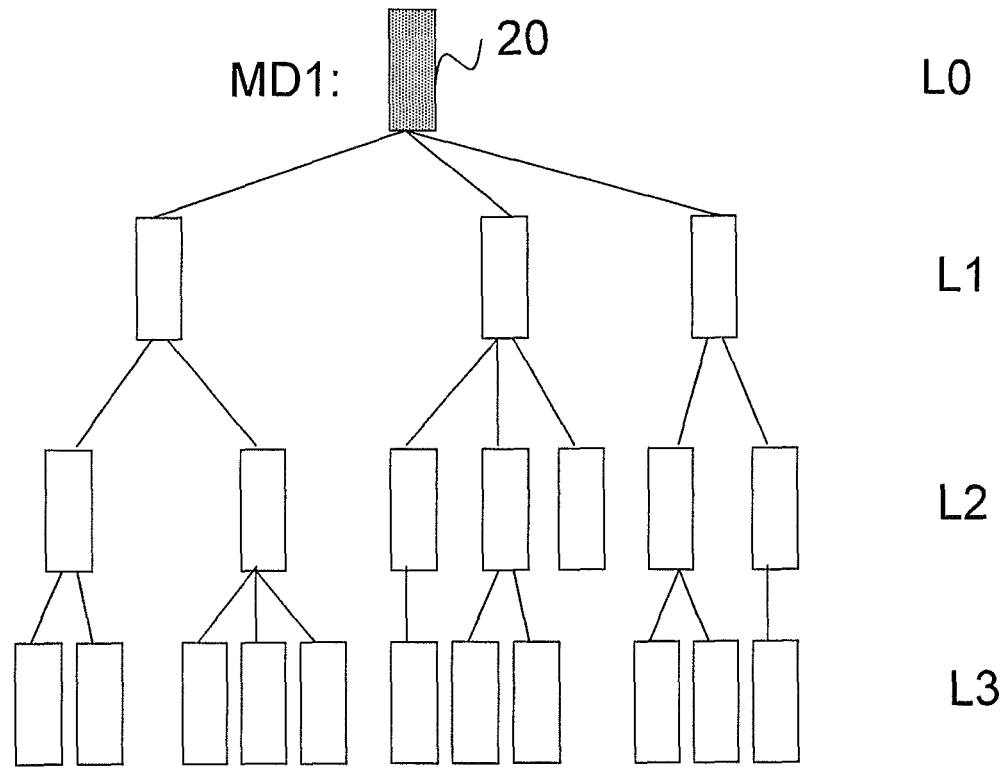
FIG. 2 illustrates an exemplary logical configuration for the monitored domain.

FIG. 2 illustrates an exemplary logical configuration for the monitored domain MD1 of FIG. 1. Each rectangle of FIG. 2 represents one monitoring module, and the group of monitoring modules forms the monitored domain MD1. The monitoring modules are shown in rows such that each row represents a level of hierarchy L0, L1, L2, L3 in the group of monitoring modules. The monitoring module 20 in the highest level L0 of hierarchy represents a master module, which is connected to the response centre and is configured to transmit its impulse signals to the response centre. Other monitoring modules of the monitored domain are subordinate to at least one other monitoring module. Subordinate relationship means that a subordinate monitoring module is connected to another monitoring module in the next higher level of hierarchy, and if the response comprises transmission of an impulse signal, the monitoring module transmits the impulse signal to the monitoring module it is subordinate to. It is noted that for simplicity each monitoring module of FIG. 2 is shown to be subordinate to one higher level monitoring module only. In practical arrangements a monitoring module may be allowed to be subordinate to any number of higher level monitoring modules. Such arrangements may be applied e.g. for adding redundancy to the alarm operations.

Each level of hierarchy in the monitored domain of FIG. 2 corresponds with a specific group of functions of the monitoring modules. FIG. 3 illustrates exemplary groups of functions L01 to L33 for the hierarchic levels L0 to L3 of the monitored domain MD1 in FIGS. 1 and 2. A function represents here a relation between an impulse signal detected by a monitoring module and a monitoring response of the monitoring module such that for each detected impulse signal a corresponding monitoring response is triggered. A monitoring response is used here to refer to a result of a monitoring module activity where the detected impulse signal and at least one other impulse signal is used to generate one or more impulse signals, and a transmission control operation of the monitoring module is applied to control sending of these one or more impulse signals to a higher level monitoring module. The monitoring response is used also to refer to a result of a monitoring module activity where the detected impulse signal and at least one other impulse signal is used and/or to generate one or more trigger signals, and a transmission control operation is applied to control sending of the one or more trigger signals to one or more alarm devices. Accordingly, the function allows defining, for example, the type of the resulting signal, the destination of the resulting signal and/or the routing or rate for transmissions of the resulting signals.

All functions of all levels of hierarchy are part of the common set of rules according to which the monitored domain is operated. For a person skilled in the art it is clear that the monitoring module may, and typically does comprise also general functions that are not specific to a level of hierarchy. These functions are not relevant for the invention and will not be discussed here.

Accordingly, when a monitoring module operates in a monitored domain, it may enter one level of hierarchy and at the same time begin to implement one or more of the functions specific to that particular level of hierarchy. The present level of hierarchy thus denotes the role the monitoring module has presently assumed in the monitored domain. In the improved monitoring system each monitoring module may dynamically change its role, i.e. exit one level of hierarchy and enter another level of hierarchy.

When a monitoring module enters a role, it may activate one or more or even all functions of the hierarchy level. The set of activated functions of the hierarchy level represent the task the monitoring module has assumed in its role in the monitored domain. In the improved monitoring system each monitoring module may also dynamically change its task, i.e. change the set of activated functions within the level of hierarchy.

FIG. 4 illustrates some exemplary roles and tasks of monitoring modules D1, D2 and D3 of the monitored domain MD1 of FIGS. 1 to 3. The monitoring module D1 operates in hierarchy level L1 and has assumed functions L11, L14 and L15 from the whole group of functions L11 to L16 of level L1. The monitoring module D2 also operates in hierarchy level L1, but has assumed all functions L11 to L16 of level L1. Accordingly, monitoring modules D1 and D2 have same roles in the monitored domain, but their tasks are different. The monitoring device D3 operates in a lower hierarchy level L2 and has assumed all functions L21, L22, L23 and L24 of level L2. Module D3 has thus a different role and a different task than D1 and D2 in the monitored domain.

As discussed, at least during times it needs to transmit an impulse signal, the monitoring module 20 in the highest level L0 of hierarchy needs to have a connection to the response centre. Correspondingly, at least during times it needs to transmit an impulse signal, any other monitoring module in the monitored domain needs to be connected to at least one other higher level monitoring module or an alarm device. The monitoring module may be configured to maintain a connection to the response centre or to one higher level monitoring module continuously or to create the connection only at the time an impulse signal needs to be transmitted. Advantageously a connection is implemented by means of one communications protocol that is supported by all monitoring modules. However, one monitored domain may also incorporate more than one connection types, and apply various connection types to create connections to higher level monitoring modules.

Figure 5:
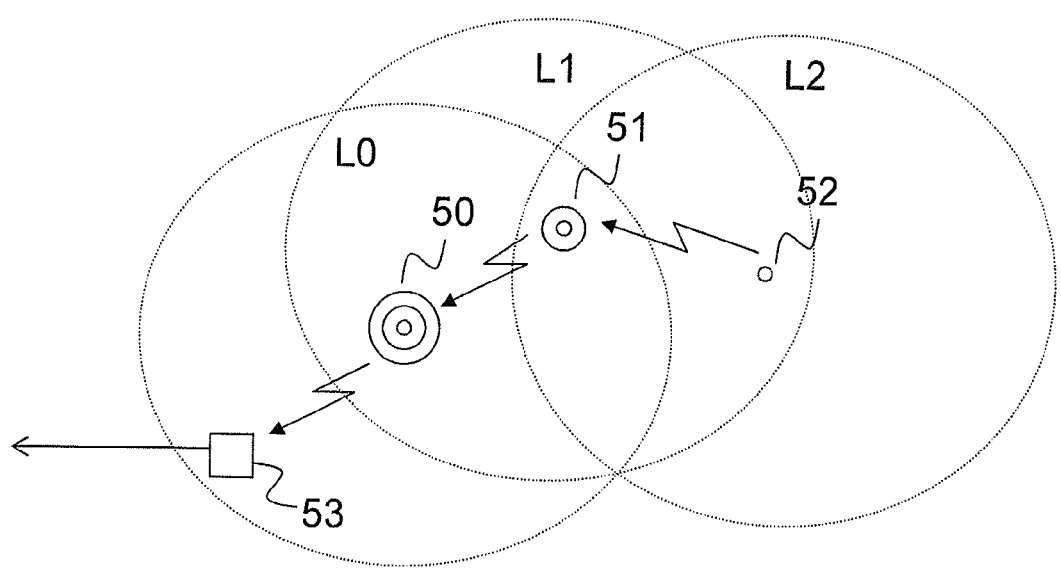
FIG. 5 illustrates an exemplary configuration for connections between three monitoring modules.

FIG. 5 illustrates an exemplary configuration for connections between three monitoring modules 50, 51, 52 of hierarchic levels L1, L2, and L3 of FIG. 2. In FIG. 5 the monitored domain is formed by a cluster of monitoring modules. The monitoring modules 50, 51, 52 are similar wireless devices and capable to communicate with other monitoring modules within their range. The topmost module 50 of the hierarchic level L0 is a master node that may have a connection to an external interface module 53 within the coverage of the master node. The external interface provides a connection via the network NET to the response centre DI. Within the range of the master node 50 is a first monitoring module 51 that is in a next lower level of hierarchy (L1), and within the range of the first monitoring module 51 is a second monitoring module 52 that is in a next lower level of hierarchy (L2). When a monitoring module enters a monitored domain, it exchanges signals with one or more of the monitoring modules within its range and through a series of message exchanges becomes part of the interconnected group of monitoring modules. The procedure for network association/registration depends on the communication protocol used. Network association/registration procedures of different technologies are typically publicly available and thus well known to a person skilled in the art.

As discussed earlier, the role and task assumed by the monitoring module correspond to a prevailing set of functions in use, i.e. the state of the monitoring module. The monitoring module may be configured to maintain at least one prevailing set of functions and dynamically change it when it detects a state transition condition. Alternatively, the monitoring module may operate as a free agent that dynamically selects the prevailing set of functions for a defined period when it detects a state transition condition. The defined period may correspond with, for example, the time from detecting the first impulse signal to implementing the monitoring response. Other periods may be applied without deviating from the scope of protection. The monitoring modules may be configured to maintain and exchange knowledge of their mutual subordinate relationships at all times, or at defined times. At minimum, the subordinate relationship needs to be established only for the time an impulse signal is delivered between two monitoring modules. The state transition conditions stored in the monitoring module provide a set of rules for dynamically determining the prevailing set of functions at any time.

Figure 6:
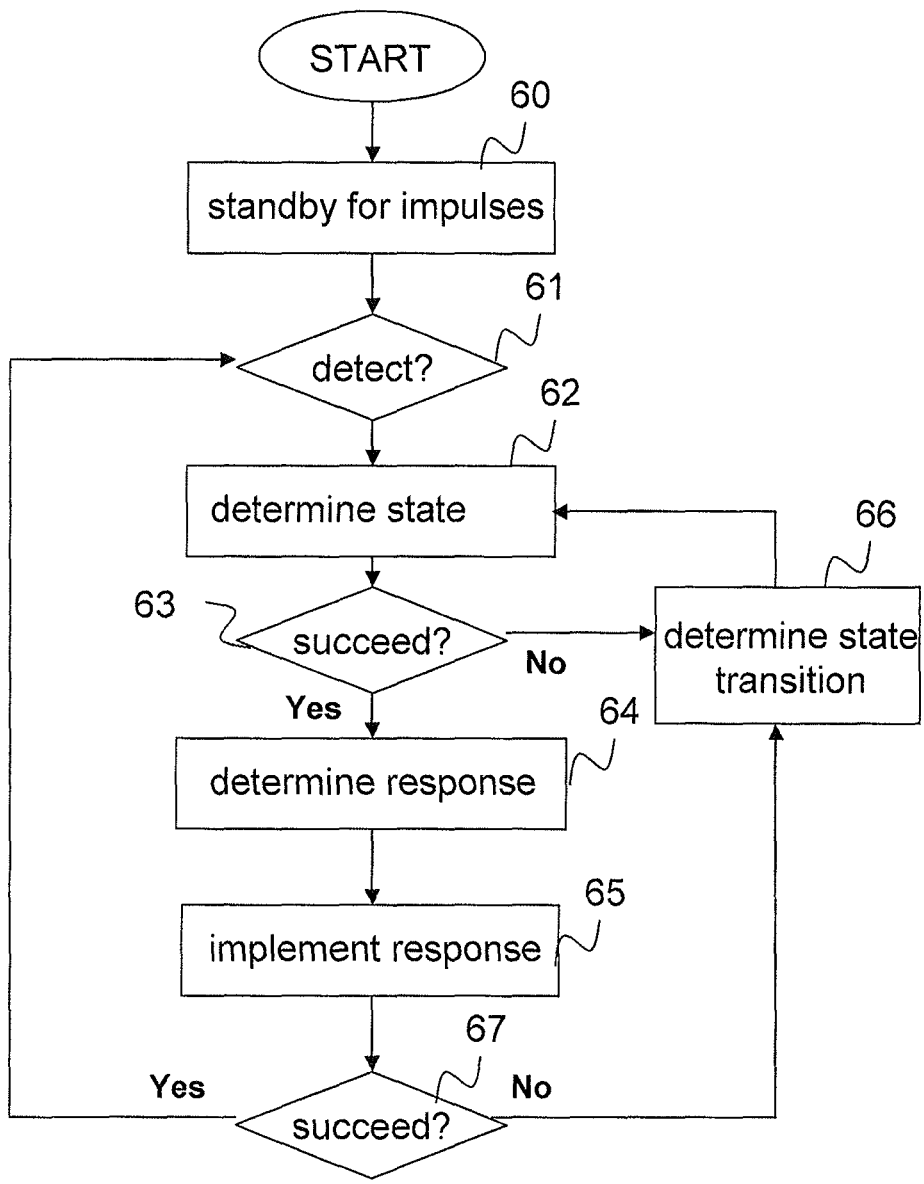
FIG. 6 provides an illustration of a state transition procedure implemented in the monitoring module.

A state transition is related to reception of an impulse signal and a possible monitoring response of the monitoring module. FIG. 6 provides a simple illustration of a state transition procedure implemented in the monitoring module. The procedure starts in when the monitoring module is switched on and operative in the monitoring system. The monitoring module is configured with a set of rules for determining a state transition and thus standby (stage 60) for impulse signals from sensors of the monitoring module and/or from another monitoring module of the monitoring system. When an impulse signal is detected (stage 61), the monitoring module determines its present state (stage 62) and then checks whether the determined state is valid (stage 63).

If the monitoring module is configured to maintain its state, the state it is presently in may be initially applied as a present state in stage 62. If the monitoring module is a free agent, it may use a default initial state as a present state, or it may comprise an algorithm for dynamically determining an initial present state for step 62. If one or more of the prevailing functions of the present state is responsive to the impulse signal (stage 63), they are applied to determine respective one or more monitoring responses (stage 64) to be implemented (stage 65) in the monitoring module.

If none of the prevailing functions of the present state is responsive to the impulse signal, the monitoring module moves to apply the internal set of rules to determine a state transition (stage 66) and moves to use the new state as a present state in step 62.

After implementing the monitoring response, the monitoring module may also check (stage 67) whether the implementation of the monitoring response was successful or not. If yes, the monitoring module may return back to stage 60 for further impulse signals. If not, it needs to implement a state transition in order to ensure that the effect of the received impulse signal is appropriately responded to.

For example, let us assume that a monitoring module that is originally in level L2 receives an impulse signal from L3 level monitoring module. Let us also assume that the prevailing set of functions of the monitoring module in level L2 comprises function L22, which is responsive to the L3 level impulse signal. This means that the monitoring module ends up trying to send a L2 level impulse signal to a L1 level monitoring module. However, when the monitoring module intends to send the L2 level impulse signal, it notices that it does not have or is not able to form a connection to any L1 level monitoring module, and the implementation of the monitoring response fails. At such situation, the monitoring module may implement a state transition to L1 level monitoring module, determine a new monitoring response with functions of a L1 level monitoring module and again check whether the implementation of the L1 monitoring response is successful. Let us assume that the L1 level monitoring response comprises sending of a further impulse signal to the L0 level monitoring module, and this is now accessible to the monitoring module. The monitoring module thus forwards the L1 level impulse signal to the L0 level monitoring module and the initial impulse becomes appropriately attended to.

The impulse signal triggering the state transition and determination of the monitoring response in a monitoring module may be received from another monitoring module in a higher, lower or in the same level of hierarchy than the monitoring module, or from a sensor attached to the monitoring module. The term sensor is interpreted widely to relate to an entity that measures or detects a defined realized condition, converts the condition into an analog or digital representation and inputs it to the monitoring module. Thus impulse signals from sensors incorporate herein also signals generated by the monitoring module during its normal operations. Such signals comprise, for example, internal clock and timer signals of the monitoring module device. Also signals related to network registration, connection setup or network association may be considered as impulse signals from sensors.

The determination of a hierarchic state of the monitoring module may thus involve a message exchange procedure that is triggered between two monitoring modules when the registration/association status of at least either or of the monitoring modules changes. Some communication technologies allow automatic discovery of new or relocated devices and their incorporation to the cluster and also permit a hierarchy of associations between the devices. When such technologies are used to connect monitoring modules, procedures for radio connections and state transitions may be implemented in parallel, which makes the implementation of the monitored domain simple and effective. In the following, exemplary operations are described with monitoring modules interconnecting with IEEE 802.15.4 and ZigBee standards-based technologies without, however, restricting the invention to these specific protocols.

IEEE 802.15.4 and ZigBee are standards-based protocols for wireless devices that are designed to provide long battery life and low cost in a small footprint network configuration. 802.15.4 typically defines the physical and MAC layers and ZigBee the network and application layers. In the following, a monitored domain implemented with this combination of technologies is referred to as a ZigBee network. ZigBee network may comprise different types of devices. A coordinator device sets up the ZigBee network, and router devices connect to the coordinator and other routers. A router can also have child devices. Formation of a monitored domain applying ZigBee begins when a monitoring module uses energy scans to identify an available channel and sets itself up to be a network coordinator. A monitoring module that intends to join the monitored domain issues first a beacon request to solicit beacons from devices that can host it. Initially only the coordinator will respond, but later on also other routers can allow new monitoring modules to join in as routers. A monitoring module joining the coordinator becomes a router and can again permit other monitoring modules to join it. As a result, multiple levels of associations can be achieved.

In the present ZigBee implementations, the possibility to create multiple level hierarchic network topologies has been applied to extend network area coverage, dynamically route around obstacles and provide backup routes in case of a network congestion or device failure. In the present embodiments, the hierarchic topology achieved with ZigBee is further combined with dynamically activated function sets specific to each hierarchic level of the monitored domain. By means of this, an impulse signal progressing through hierarchies towards elements of the response system is not only routed optimally, but also undergoes various different functions in each level it passes. Each such function adds causality to the processing of the impulse signals and may be used to process unnecessary impulses already at the lower levels of hierarchy. Compared to a centrally operated monitored domain, this arrangement thus significantly reduces the amount of impulses delivered to the response centres, and thereby alleviates the possible bottleneck effects of centralized systems. In general the arrangement eliminates any unnecessary alarms in the various elements of the response system. In addition, hierarchy level-specific causality facilitates use of more exact and dynamic conditions to test the validity of the impulse. The monitoring system thus provides also for improved level of security.

A monitoring module may determine and implement a monitoring response when it receives an impulse signal from a sensor attached to the sensor module or an impulse signal from another monitoring module in a lower level of hierarchy in the monitored domain. Referring back to FIG. 2, all monitoring modules in level L3 and one monitoring module in level L2 are without subordinate monitoring modules and therefore receive impulse signals only via sensors. Other monitoring modules that have subordinate monitoring modules may be responsive to signals from attached sensors, but in addition they may be responsive to impulse signals received from monitoring modules subordinate to them. The impulse signals from subordinate monitoring modules may comprise various types of information, for example information on a detected alarm, location information of the subordinate module, status information on the subordinate module (e.g. battery level), etc.

Figure 7:
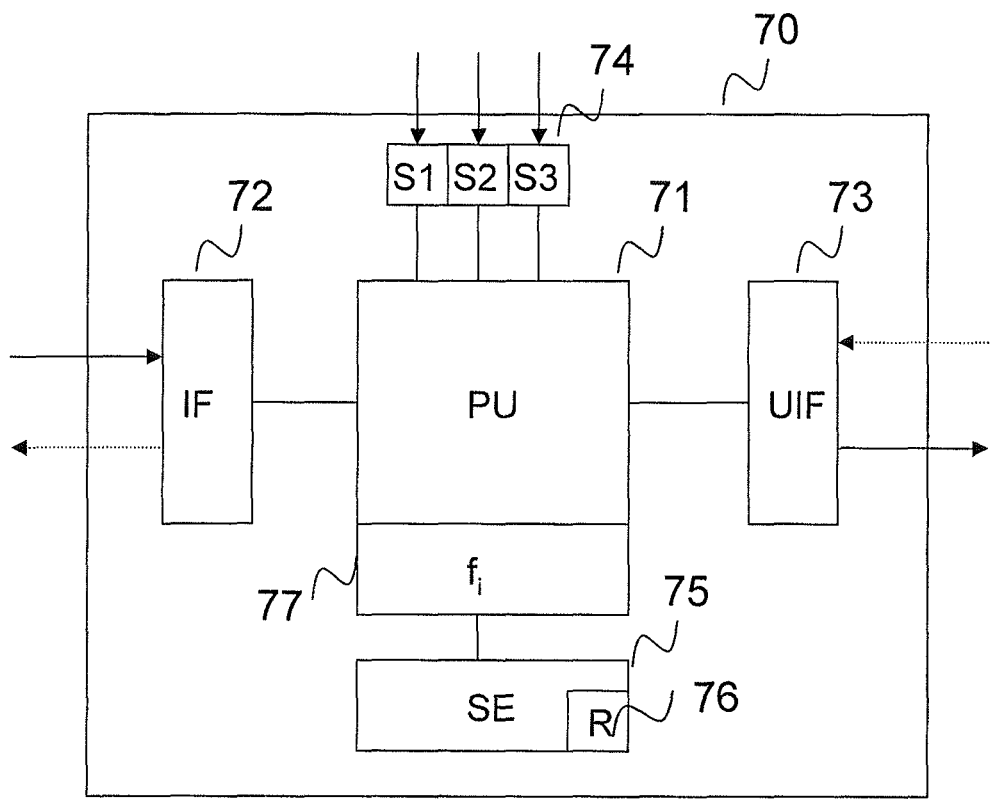
FIG. 7 provides a functional illustration of a monitoring module.

Whatever the cause of the impulse signal, a monitoring module in the improved monitoring system deals with it with a set of functions according to its present role and task. Advantageously, when the monitoring module determines a monitoring response for a received impulse signal, it applies at least one function that uses the information from the received impulse signal and information from at least one other received impulse signal. FIG. 7 illustrates implementation for the procedure of FIG. 6 with a functional configuration of a monitoring module 70 for the monitored domain of FIG. 2. The units of the monitoring module are device entities that comprise hardware and software to perform operations on received and/or stored data according to predefined, essentially programmed processes. Implementation of such device entities is well known to people skilled in the art. The monitoring module comprises a processor unit 71 for systematic execution of operations upon data. The processor unit 71 is an element that essentially comprises one or more arithmetic logic units, a number of special registers, control circuits, and data medium where computer-readable data or programs, or user data can be stored. The data medium typically comprises volatile or non-volatile memory, for example EEPROM, ROM, PROM, RAM, DRAM, SRAM, firmware, programmable logic, or the like.

The monitoring module also comprises an interface unit 72 with at least one input unit for inputting data to the internal processes of the monitoring module and at least one output unit for outputting data from the internal processes of the monitoring module. If a line interface is applied, the interface unit typically comprises plug-in units acting as a gateway for information delivered to its external connection points and for information fed to the lines connected to its external connection points. If a radio interface is applied, the interface unit typically comprises a radio transceiver unit, which includes a transmitter and a receiver.

The interface unit 72 is functionally connected to the processor unit 71. For example, the transmitter of the radio transceiver unit receives a bitstream from the processing unit 71, and converts it to a radio signal for trans-mission by the antenna. Correspondingly, the radio signals received by the antenna are led to the receiver of the radio transceiver unit, which converts the radio signal into a bitstream that is forwarded for further processing to the processor unit 71. Different radio interfaces may be implemented with one radio transceiver unit, or separate radio transceiver units may be provided for the different radio interfaces.

The monitoring module may also comprise a user interface 73 for inputting and/or outputting data to the user of the monitoring module. The user interface may apply one or more buttons, a keypad, a touch screen, a microphone, or equals for inputting data and one or more light emitters, a screen, a loudspeaker, or equals for outputting data to the user of the monitoring module.

A typical monitoring module is a lightweight, battery-saving apparatus that applies some wireless protocol, like ZigBee in the interface unit and provides a simple user interface with some push buttons for inputting from and some LEDs for outputting information to the user.

The monitoring module of FIG. 7 may comprise also one or more attached sensors. As discussed earlier, a sensor refers to a device that measures or detects a defined real-world condition, converts the condition into an analog or digital representation and inputs it to the processor unit 61 of the monitoring module. The sensor may be attached to the monitoring module by incorporating or integrating it to the monitoring module device, or by some other means facilitating that the analog or digital signals of the sensor become accessible to the monitoring module processes. Examples of measured or detected real-world conditions may associate to position, time, ambient temperature, ambient humidity, ambient noise level, signals generated in the monitoring module (e.g. battery level indication, acceleration indication, operational signal, etc.), among others.

In addition, the monitoring module comprises a state engine 75 that comprises a set of rules 76 for determining the state of the monitoring module, i.e. a prevailing set of one or more functions 77 according to which subsequent impulse signals received from the sensors or from other monitoring modules are processed. In other words, the state engine 75 monitors the operation of the monitoring module, and at defined conditions applies the rules to determine the role and/or task of the monitoring module. When a role and task, i.e. the state of the monitoring module is defined, it processes impulses from the sensors or the input interfaces according to the set of functions associated to that state, until another change to the state of the monitoring module is made.

The set of rules may comprise rules that allow independent state transition decisions where impulse signals triggering the state transition are generated by the monitoring module itself. For example, the state engine may be arranged to monitor signals of a programmed timer or time sensor attached to the monitoring module, and then comprise a rule to change the state of the monitoring module at defined times or the day. The set of rules may also comprise rules that are triggered via interaction with the other monitoring modules. For example, the monitoring module may be arranged to monitor impulse signals received from the monitoring module it is subordinate to, and implement a state transition when in this way told to by the higher level monitoring module. State transition may also be initiated in response to an impulse signal from a subordinate monitoring module. State transition may be triggered also by lack of impulse signals from another monitoring module. For example, in case a monitoring module does not receive any impulse signal from a higher-level monitoring module it should become subordinate to, it may assume the role of the higher-level monitoring module. It may further order any monitoring module connected with it to change its role correspondingly, or become subordinates to some other monitoring module without changing the level of hierarchy.

Accordingly, the state engine 76 is functionally connected with the processor unit 71 and receives part or all of the signals received by the processor unit. The state engine 76 comprises a predefined set of rules according to which it manages the state, i.e. selection of the role and task of the monitoring module. This way the state engine manages dynamically the hierarchic level the monitoring module operates in, and at the same time controls the way the impulse signals are processed in their way towards elements of the response system.

Each possible state for the monitoring modules conventionally comprises a simple general function for forwarding an alarm received from a subordinate monitoring module as such to a higher-level monitoring module. However, in the enhanced monitoring module a more effective and secure operation is achieved with level-specific functions that apply at least two impulse signals and by means of them determine whether an impulse is truly needed. This allows blocking of impulse signals that are deemed unnecessary. More specifically, the level-specific function advantageously applies information from at least two impulse signals that for the first time are simultaneously detected by the monitoring module that invokes the function. This way unnecessary impulse signals may be blocked as soon as a level where all information needed for the blocking decision is reached. Due to the possibility of dynamic state transitions, safe delivery of impulses is ensured at all times.

In general, various embodiments of the monitoring module may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any apparatus-readable data storage medium and they include program instructions to perform particular tasks. Thus the exemplary embodiments of this invention also provide a computer program product, readable by a computer and encoding instructions for executing a monitoring process in the monitoring module of FIG. 7.

For example, referring also back to FIGS. 2 to 4, let us assume that the monitoring module 70 is configured for the monitored domain of FIG. 2, so it initially stores all functions L01 to L33 of hierarchic levels L0 to L3 of FIG. 3. When it associates for the first time to the monitored domain, it may by default first assume the state of D1 in FIG. 4, and begin to operate in level L1 with the set of functions L11, L14 and L15. Let us also assume that functions L12, L13 and L16 are functions that apply signals from S1, S2, and S3, respectively. After initial association the state engine 76 of the monitoring module 70 may check availability of sensors S1, S2, S3 74, and if they are available, implement a transition to state of D2 in FIG. 4. Accordingly, the monitoring module may keep its role but assumes another, more versatile task in the monitored domain.

Figure 8:
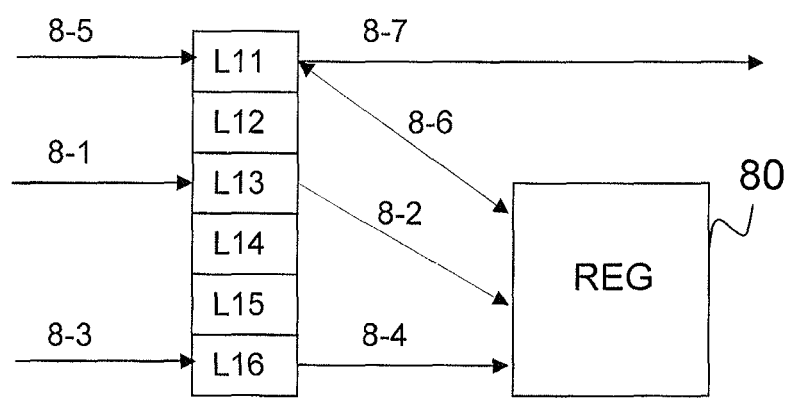
FIG. 8 illustrates exchange of data within functional entities of the processor unit of the monitoring module in association with three exemplary incoming signals.

Continuing the same example, FIG. 8 illustrates an example of use of functions in generation of a monitoring response in this exemplary D2 state monitoring module based on three different operational impulses. The exemplary functions of D2 may be presented with pseudocode as L11: IF (OBJ moved) AND ((L13=TRUE) AND (L16=FALSE)) THEN ALARM
L12: (void)
L13: TRUE ONLY IF (time=night)
L14: (void)
L15: (void)
L16: TRUE ONLY IF (ID in range).

L12, L14 and L15 are not necessary for this example and are therefore left void in the description. FIG. 8 illustrates exchange of data within the illustrated functional entities of the processor unit of the monitoring module in association with three exemplary incoming signals. Function L13 associates to a sensor S2 that provides a clock signal to the processor unit. The function L13 determines that times between 6:00 p.m. and 6:00 a.m. relate to nighttime and at that those times returns Boolean value TRUE. At other times the value is FALSE. The sensor S2 feeds the clock signal (8-1) to the processing unit at intervals and the processing unit applies L13 to determine the monitoring response by determining the Boolean value that corresponds with the value of the clock signal and storing (8-2) it to an internal data repository 80 for later use.

Function L16 associates to detection of a person with specific identity ID in the range of the monitoring module or any of its subordinate modules. Let us assume that the monitored domain comprises a number of monitoring modules that are used as personal key tag terminals. At any time this monitoring module may be subordinate to at least one other monitoring module of the monitored domain. For example, the key tag may be configured such that when the holder of the key tag moves around, it associates to the monitored domain as a monitoring device and becomes subordinate to a higher level monitoring module in its neighborhood. Let us assume that this higher level monitoring module is the monitoring module of FIG. 8. When the key tag announces its existence (8-3) to the monitoring module, the processing unit may apply function L16 to determine whether to forward the received impulse signal with existence announcement towards the response centre (not shown). In addition, the processing unit may apply function L16 to determine a Boolean value that corresponds with the existence announcement and storing (8-2) the Boolean value to the internal data repository 80 for later use. This exemplary Boolean value is TRUE when a particular ID (or one ID of the group of IDs) is subordinate to the monitoring module, otherwise it is FALSE.

Function L11 associates to a signal received from a subordinate monitoring module that incorporates a motion sensor of a defined object OBJ. If the object is moved, the subordinate monitoring module transmits an impulse signal with alarm to the monitoring module of FIG. 7. However, instead of merely routing the impulse signal with alarm 8-5 forward, the processor unit applies function L11 and three received impulse signals 8-1, 8-3, 8-5 to check whether the alarm is truly necessary. Let us assume that the identity ID may be of an entrusted person who is allowed to move the object within the monitored domain during daytime. The processor unit may use function L11 to inquire (8-6) the Boolean values stored by functions L13 and L16 from the internal data repository and then test whether the combination of the values leads to transmission of an impulse signal (8-7) or not.

This example shows that use of hierarchy-level functions reduces the amount of unnecessary impulse signals and thus improves efficiency of the monitoring system. In addition, the example demonstrates the achieved improvement of security. In a conventional system, for authorized moving of a secured object one has to switch off the motion detector, and possibly a whole group of clustered monitoring sensors. Accordingly, during the authorized operation, the security of the object and possibly of a group of other monitored entities is severely compromised. In the enhanced monitoring system according to the invention, the authorized operation can be performed by an authorized operation without necessarily switching off any of the monitoring modules, and thus maintain a consistent level of security.

A further advantage of the proposed arrangement is that it allows improved scalability for the system. Basically in conventional systems the capacity of a centrally managed response centre could be increased by adding more lines to the response center and increasing processing capacity to the response center. However, at some point such increase of capacity is no longer practical or economically viable, and typically commercially available systems define a strict capacity limit for implementations. In the proposed system, instead of a plurality of lines from all monitoring modules to the response center, only a connection between the one or more master nodes and the response center is needed, and a connection is needed at minimum only when there is an impulse signal to deliver. In addition, the validity of the monitoring response may be tested and its content decided at the earliest possible point when enough information to make the decision are available, so the central response system does not need to store and maintain all possible rules relevant for any module in the whole monitored domain, or collect and process impulses from all the monitoring devices. The aspects are valid for both types of monitoring responses, i.e. to trigger signals to alarm devices or to impulse signals delivered to other monitoring modules.

For a person skilled in the art it is clear that the arrangement provides a practically unlimited capability to improve the accuracy of the monitoring operations within the monitored domain. For example, in the example of FIG. 8, the function L11 could be complemented with an additional condition that is responsive to location information of the identified person ID. The area of the monitored domain could be divided into sections, part of which would be allowable such that the entrusted person could move the object only within the allowed sectors of the monitored domain during daytime. Such levels of detail could in conventional systems be implemented for very limited monitoring module populations only.

In addition, or as an alternative to improving accuracy of the monitoring operations via use of added conditions, the possibility to apply information in a first hierarchical level where two pieces of information are available to a monitoring module greatly improves efficiency of the monitoring system. For example, the monitored domain is a logical entity where monitoring modules may move around and establish connections with monitoring modules in their range. As known from cellular telecommunications technologies, signaling required to support such mobility allows at the same time relative positioning, i.e. positioning of individual monitoring modules in relation with one or more other monitoring modules. This location information has conventionally been delivered to the response centre, either in form of measured position data to be computed by the response centre, or as position data computed from the measured position data by the monitoring module or by any other monitoring module that has access to measured data on the monitoring module. If the position of one or more of the monitoring modules providing the measurement data is known, the relational positioning data may be refined to absolute positioning data.

In the enhanced monitoring system, any monitoring module in the monitored domain may be provided with absolute positioning data of one or more other monitoring modules. After this the monitoring module may apply the absolute positioning data with relational positioning data in the first possible instance they both are available. After having the absolute positioning information in the monitoring device, monitoring modules in higher levels of hierarchy may apply the absolute positioning data as a basis for determining their responses.

For example, let us assume that the monitored domain is placed in a moving train and monitoring modules may detect each other and thereby position each other relationally. Let us further assume that a monitoring module is designed to receive timed standby signals from another monitoring module in a lower level of hierarchy, and in the absence of the standby signals to trigger an alarm in the train or send an impulse signal with an alarm to a monitoring module in a higher level of hierarchy. As long as only relative positions are available to the monitoring module, it thus initiates an alarm at every time the timed signal fails to be received at an expected time. However, an enhanced monitoring module may be configured with means to detect its own absolute position, and with hierarchy-specific function associating some absolute positions to areas of high interference. By means of this, the monitoring module may perform a further deliberation and accept temporarily longer periods between received standby signals before it triggers the alarm. Alternatively, if the absolute position and association between absolute positions and areas of high interference is available to the monitoring module sending the standby signals, it may use this information to increase the rate of standby signal transmissions in areas of high interference. The monitoring operations can thus be adjusted to be accurate such that unnecessary alarms in areas of high interference are automatically eliminated.

The steps/points, signaling messages and related functions described above in FIGS. 1 to 8 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It will be obvious to a person skilled in the art that, as technology advances, the inventive concept can be implemented in various ways. The invention and its embodiments are not limited to the examples described above but may vary within the scope of the claims.

The invention claimed is:

1. A method for operating a monitoring module in a monitoring system, comprising:
configuring the monitoring module to detect impulse signals from sensors of the monitoring module and from other monitoring modules of the monitoring system;
configuring the monitoring module to dynamically change its role within the monitoring system, wherein each role is defined by with a group of functions, a function defining a relation between an impulse signal detected by a monitoring module and a monitoring response of the monitoring module;
detecting, by the monitoring module, one or more impulse signals from a sensor of the monitoring module and/or from another monitoring module of the monitoring system;
selecting, in the monitoring module on a basis of the detected one or more impulse signals, a role of the monitoring module within the monitoring system;
determining a prevailing set of functions in a group of functions corresponding to the selected role;
determining one or more monitoring responses with the prevailing set of functions.

2. A method according to claim 1, further comprising configuring the monitoring module to dynamically change its task by dynamically changing the prevailing set of functions within the group of functions corresponding to the selected role of the monitoring module, wherein the set of functions is changed on the basis of the detected one or more impulse signals.

3. A method according to claim 1, wherein said selecting the role of the monitoring module comprises:
determining whether or not a current role of the monitoring module is valid for the detected one or more impulse signals;
upon determining that the current role is valid, maintaining the current role; and
upon determining that the current role is not valid, applying an internal set of rules to determine a new role and applying the determined new role and a new group of functions corresponding to the new role.

4. A method according to claim 1, wherein monitoring system comprises monitoring modules on a plurality of hierarchy levels, and wherein the change of the role of the monitoring module is triggered by an impulse signal received from another monitoring module that is on a higher or lower level of hierarchy in the monitoring system than said monitoring module.

5. A method according to claim 1, wherein the change of the role of the monitoring module is triggered by an impulse signal received from a sensor attached to the monitoring module.

6. A method according to claim 1, further comprising selecting the role on the basis of lack of impulse signals.

7. A method according to claim 1, characterized by configuring the impulse signals from sensors of the monitoring module to represent one or more conditions detected by the sensors, the conditions depending on one or more of the following: position of a sensor, present time, ambient temperature, ambient humidity, ambient noise level, signals generated by the monitoring module during its normal operations.

8. A method according to claim 1, wherein a plurality of impulse signals from a plurality of different types of sensors are detected, said determining one or more monitoring response comprising:
processing an input signal received from each sensor with a function associated with the corresponding input signal, thus resulting in a plurality of response values, each response value corresponding to a function;
testing whether or not the combination of the response values leads to transmission of an impulse signal;
if the combination of the response values leads to the transmission of the impulse signal, transmitting the impulse signal to another monitoring module.

9. A monitoring system comprising:
a monitoring module comprising at least one processor and at least one memory including a computer program code, wherein the at least one memory and the computer program code are configured, with the at least one processor, to cause the monitoring module to:
detect impulse signals from sensors of the monitoring module and from other monitoring modules of a monitoring system;
change its role within the monitoring system, wherein each role is defined by with a group of functions, a function defining a relation between an impulse signal detected by a monitoring module and a monitoring response of the monitoring module;
detect one or more impulse signals from at least one of a sensor of the monitoring module and from another monitoring module of the monitoring system;
select, on the basis of a detected one or more impulse signals, a role of the monitoring module within the monitoring system;
determine a prevailing set of functions in a group of functions corresponding to the selected role;
determine one or more monitoring responses with the prevailing set of functions.

10. A monitoring system according to claim 9, wherein the monitoring module is further configured to dynamically change its task by dynamically changing the prevailing set of functions within the group of functions corresponding to the selected role of the monitoring module, wherein the monitoring module is configured to change the set of functions on the basis of the detected one or more impulse signals.

11. A monitoring system according to claim 9, wherein the monitoring module is configured to select the role of the monitoring module by:
determining whether or not a current role of the monitoring module is valid for the detected one or more impulse signals;
upon determining that the current role is valid, maintaining the current role; and
upon determining that the current role is not valid, applying an internal set of rules to determine a new role and applying the determined new role and a new group of functions corresponding to the new role.

12. A monitoring system according to claim 9, wherein monitoring system comprises monitoring modules on a plurality of hierarchy levels, and wherein the monitoring module is configured to trigger the change of the role of the monitoring module upon receiving an impulse signal from another monitoring module that is on a higher or lower level of hierarchy in the monitoring system than said monitoring module.

13. A monitoring system according to claim 9, wherein the monitoring module is configured to trigger the change of the role of the monitoring module upon receiving an impulse signal from a sensor attached to the monitoring module.

14. A monitoring system according to claim 9, wherein the monitoring module is configured to select the role on the basis of lack of impulse signals.

15. A monitoring system according to claim 9, wherein the monitoring module is configured to:
detect a plurality of impulse signals from a plurality of different types of sensors are detected;
process an impulse signal received from each sensor with a function associated with the corresponding input signal, thus resulting in a plurality of response values, each response value corresponding to a function of the group of functions corresponding to the selected role;
test whether or not the combination of the response values leads to transmission of an impulse signal to another monitoring module;
if the combination of the response values leads to the transmission of the impulse signal, transmit the impulse signal to the other monitoring module.

* * * * *